July 9, 1940.   R. TAMPIER   2,207,387
CONTROL SURFACE ON AIRCRAFT
Filed March 22, 1939   2 Sheets-Sheet 1
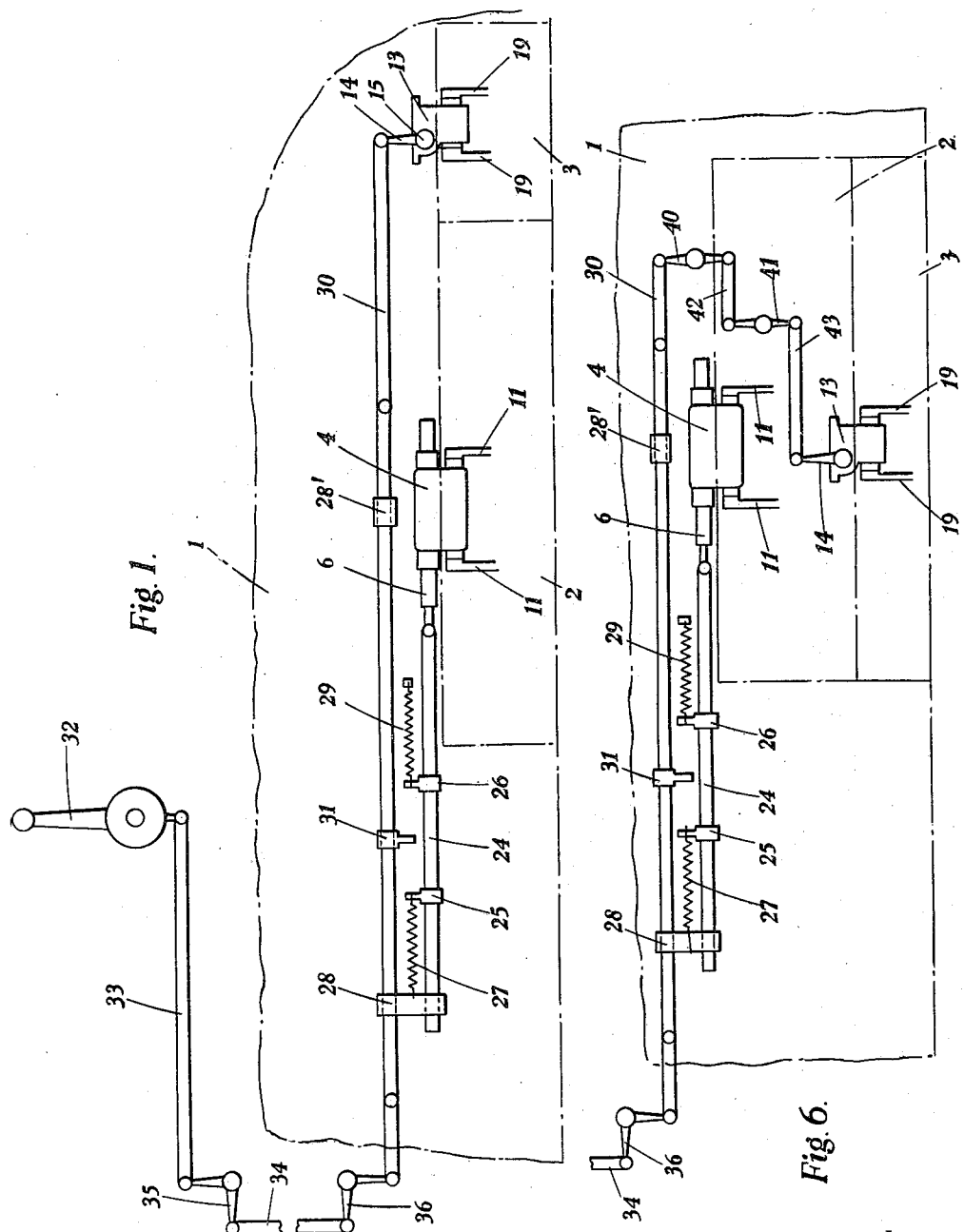
Inventor
René Tampier
by
A. Knight Leroad
Attorney July 9, 1940.  R. TAMPIER  2,207,387
CONTROL SURFACE ON AIRCRAFT
Filed March 22, 1939  2 Sheets-Sheet 2
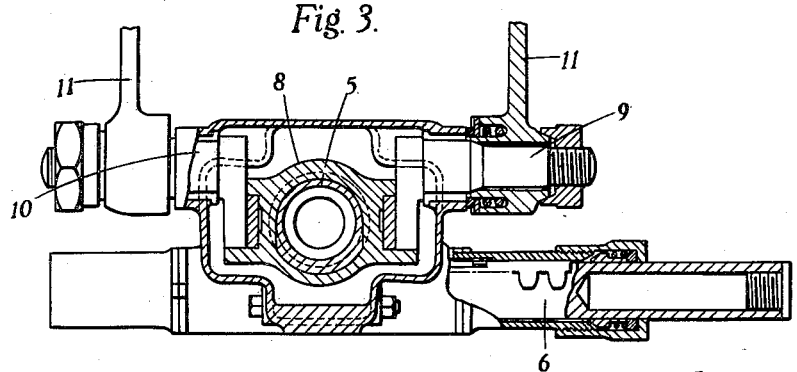
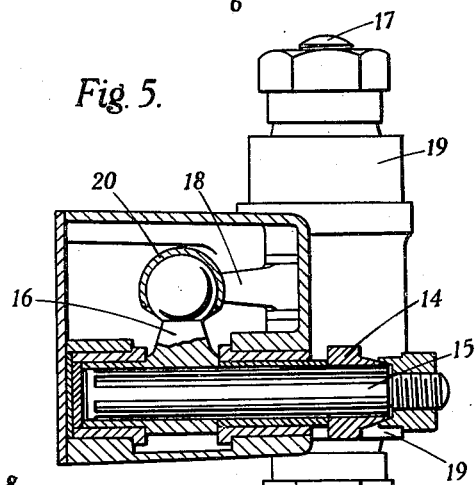
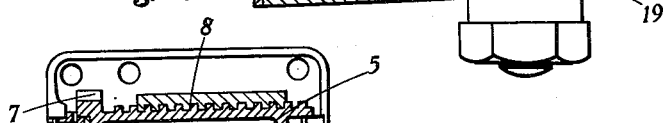
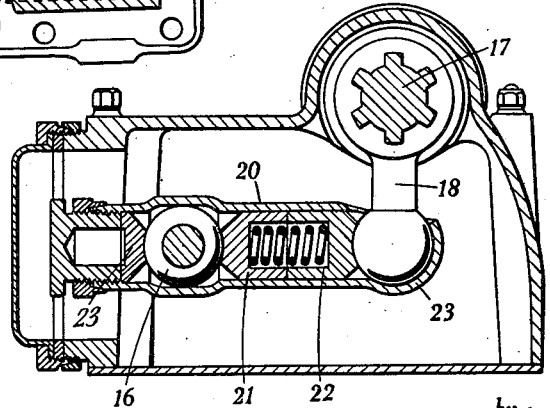
Inventor
René Tampier
by
*A. Knight Lewis*
Attorney Patented July 9, 1940

2,207,387

UNITED STATES PATENT OFFICE 2,207,387

CONTROL SURFACE ON AIRCRAFT

René Tampier, London, England

Application March 22, 1939, Serial No. 263,353
In Great Britain March 26, 1938

5 Claims. (Cl. 244—83)

This invention relates to control surfaces on aircraft.

If a control surface on an aircraft is designed to be effective at a low speed, the area of the surface will usually be too large for efficient use at high speed, so that at high speeds a small movement of the control column may lead to a relative large movement of the machine. Thus, at high speeds the machine becomes too sensitive to its controls.

The object of the present invention is to overcome this disadvantage and to provide a control surface which is effective both at high and at low speeds of the aircraft.

This object is attained according to the present invention by using a control surface comprising a relatively small area for use at high speeds, a reversible hinge connection between the said small area and a fixed part of the aircraft, a relatively large area for use at slower speeds, an irreversible hinge connection between said large area and a fixed part of the aircraft, means operable from the cockpit for directly operating the reversible hinge connection to actuate the small area, and means for operating the irreversible hinge to actuate the large area, these last mentioned means being effective only after the reversible hinge has been actuated to a predetermined extent.

The device may further comprise a rack member for actuating the irreversible hinge, means for normally holding the rack in position, a primary rod or like member for operating the hinged connection of the relatively small area, and means carried on said primary rod for actuating, when desired, the rack member of the irreversible hinge.

The device may further comprise a secondary rod or the like connected to said rack, means for holding the secondary rod normally in a fixed position, one or more projections on the secondary rod, and a projection on the primary rod adapted after a predetermined displacement of the primary rod to contact with the stop or stops on the secondary rod to actuate the rack member of the irreversible hinge.

The two areas of the control surface may be disposed side by side, or they may be hingeably connected in tandem.

The invention is illustrated in the accompanying drawings, wherein:

Figure 1 is a plan view showing a part of the wing of an aeroplane, a control surface, and mechanism for operating the control surface;

Figure 2 is a longitudinal sectional view of a hinge mechanism, and Figure 3 is a more complete view thereof partly in section and taken at right angles to Figure 2;

Figure 4 is a longitudinal section of another hinge mechanism, and Figure 5 a cross section thereof; and Figure 6 is a view similar to Figure 1 of a modified embodiment of the invention.

In the drawings, 1 represents a fixed part of an aeroplane, i. e., a wing, fitted with a control surface which in the case illustrated is an aileron, comprising two separately movable areas or surfaces, namely, a relatively large surface 2, and a relatively small surface 3. The larger surface 2 is hingeably connected to the wing by a hinge mechanism 4 comprising an irreversible hinge, forming the subject of my patent application S. No. 204,545, filed April 27, 1938, in which the construction is described in detail. The essential features of construction of the hinge 4, are illustrated in Figures 2 and 3. Briefly it consists of a screw 5 adapted to be revolved by a rack 6, operable from the cockpit of the machine, engaging a pinion 7 fixed to the screw, a nut 8 being translatable along the screw when the latter is turned and actuating two sets of pins 9, 10 fixedly connected respectively to arms 11, connected in turn to the part 2 of the control surface. The pitch of the thread of the screw and nut are designed to provide an irreversible device.

The smaller surface 3 is connected to the wing by a hinge mechanism 13 which may be of similar construction to the hinge 4 or of different construction, but, as shown in Figures 1, 4 and 5, is made as fully described in the specification to my patent application S. No. 215,938, filed June 25, 1938, which has matured into Patent Number 2,155,513. Briefly it consists of an operating lever 14, adapted when actuated to rotate a shaft 15 provided at its inner end with a ball-ended crank arm 16, and a second shaft 17 disposed at right angles to the shaft 15, and also provided with a ball-ended crank arm 18. The shaft 17 constitutes the hinge pin for the aileron and is provided near its ends with two arms 19 adapted to be connected to the aileron. The ball ends of the crank arms 16, 18 are connected together by a member 20, which contains two socket members 21, 22 in the form of spring loaded plungers which maintain one of the ball ends pressed against a socket member 23 at the other end, the latter socket member being adjustably mounted in the member 20 to vary the pressure of the plungers on the ball ends. Rotation of the shaft 15 thus produces a corresponding rotation of the shaft 17.

The rack 6 of the hinge mechanism 4 is operatively connected to a rod 24 on which two stops or projections 25, 26 are carried in spaced relationship. The stop 25 is connected to one end of a spring 27, the other end of which is anchored to a bearing 28 fixed to the wing 1. Similarly, the stop 26 is connected to one end of a spring 29, the other end of which is anchored to the wing 1.

The hinge 13 is operated from the cockpit of the machine by actuating the operating hande 32 connected through rods 33, 34 and pivoted bellcrank levers 35, 36 with a primary jointed operating rod 30 supported in bearings 28, 28¹, and connected to lever 14. The rod 30 carries a stop 31 disposed between the stops 25 and 26 carried on the rod 24 and in line with these stops.

The operation is as follows:

Assuming the aircraft is flying at a high speed it will only be necessary to operate the smaller surface 3 of the control surface and this can be effected by displacing the rod 30 within the limits of the stops 25 and 26. At lower speeds it will be necessary to operate both the smaller surface 3 and the larger surface 2, and this can be effected by displacing the rod 30 to a larger extent, so that it strikes against stop 25 or stop 26, and thus displaces the rod 24 and rack 6 and consequently operates the hinge 4 in the desired direction simultaneously energising one of the springs 27, 29. When the movement of the rod 30 is reversed the spring 27 or 29 automatically returns the rod 24 so that the return movement of the surface 2 is effected with the movement of the surface 3.

With such an arrangement the surface 2 may be adjusted by the pilot as desired. It is evident that means other than the springs 27, 29 may be provided for maintaining the surface 2 in the normal position.

Further means other than those described may be provided for operating the two surfaces 2 and 3.

In Figure 1 the surfaces 2 and 3 are disposed in line with one another. The arrangement shown in Figure 6 operates in the same way as Figure 1, but in Figure 6 the surfaces 2 and 3 are connected in tandem. The operating connection between the rod 30 and hinge 13 now includes the pivoted levers 40, 41 and rods 42, 43.

The use of the irreversible hinge 4 permits of avoiding vibration or fluttering of the surface, as has been fully described in the specification to my above mentioned patent application S. No. 204,545.

What I claim is:

1. In aircraft a control surface comprising a relatively small area for use at high speeds, a reversible hinge connection between the said small area and a fixed part of the aircraft, a relatively large area for use at slower speeds, an irreversible hinge connection between said large area and a fixed part of the aircraft, means operable from the cockpit for directly operating the reversible hinge connection to actuate the small area, and means for operating the irreversible hinge to actuate the large area, these last mentioned means being effective only after the reversible hinge has been actuated to a predetermined extent.

2. In aircraft a control surface comprising a relatively small area for use at high speeds, a reversible hinge connection between the said small area and a fixed part of the aircraft, a relatively large area for use at slower speeds, an irreversible hinge connection between said large area and a fixed part of the aircraft, means operable from the cockpit for directly operating the reversible hinge connection to actuate the small area, means for operating the irreversible hinge to actuate the large area, these last mentioned means being effective only after the reversible hinge has been actuated to a predetermined extent, and means for returning the two surfaces, after they have been operated in either direction, into a position in which they are substantially in the same plane as the body of the wing.

3. In aircraft a control surface comprising a relatively small area for use at high speeds, a reversible hinge connection between the said small area and a fixed part of the aicraft, a relatively large area for use at slower speeds, an irreversible hinge connection between said large area and a fixed part of the aircraft, a primary actuating member operable from the cockpit for operating the reversible hinge connection to actuate the small area, a rack member for actuating the irreversible hinge, and means carried on said primary rod for actuating the rack member of the irreversible hinge to actuate the large area, these last mentioned means being effective only after the reversible hinge has been actuated to a predetermined extent.

4. In aircraft a control surface comprising a relatively small area for use at high speeds, a reversible hinge connection between the small area and a fixed part of the aircraft, a relatively large area for use at slower speeds, an irreversible hinge connection between said large area and a fixed part of the aircraft, a primary actuating member operable from the socket for operating the reversible hinge connection to actuate the small area, a rack member for actuating the irreversible hinge, a secondary actuating member connected to said rack member, a stop device on the secondary actuating member, and a stop device on the primary actuating member adapted after a predetermined displacement of the primary actuating member to co-operate with the stop device on the secondary actuating member to actuate the rack member of the irreversible hinge.

5. In aircraft a control surface comprising a relatively small area for use at high speeds, a reversible hinge connection between the said small area and a fixed part of the aircraft, a relatively large area for use at slower speeds, arranged in tandem with the small area, an irreversible hinge connection between said large area and a fixed part of the aircraft, means operable from the cockpit for directly operating the reversible hinge connection to actuate the small area, and means for operating the irreversible hinge to actuate the large area, these last mentioned means being effective only after the reversible hinge has been actuated to a predetermined extent.

R. TAMPIER.